(12) United States Patent
Lemmen et al.

(10) Patent No.: US 11,363,765 B2
(45) Date of Patent: Jun. 21, 2022

(54) DEVICE WITH COUPLED BEDS FOR GROWING MUSHROOMS

(71) Applicants: Jacobus Alexander Jozef Lemmen, Venlo (NL); Marcus Gerardus Maria Van Doremaele, Velddriel (NL)

(72) Inventors: Jacobus Alexander Jozef Lemmen, Venlo (NL); Marcus Gerardus Maria Van Doremaele, Velddriel (NL)

(*) Notice: Subject to any disclaimer, the term of this patent is extended or adjusted under 35 U.S.C. 154(b) by 0 days.

(21) Appl. No.: 17/110,927

(22) Filed: Dec. 3, 2020

(65) Prior Publication Data

US 2021/0169018 A1   Jun. 10, 2021

(30) Foreign Application Priority Data

Dec. 4, 2019 (NL) .................................... 2024383

(51) Int. Cl.
*A01G 18/64* (2018.01)
*A01G 18/62* (2018.01)
(Continued)

(52) U.S. Cl.
CPC ............. *A01G 18/64* (2018.02); *A01G 18/20* (2018.02); *A01G 18/62* (2018.02); *A01G 18/70* (2018.02)

(58) Field of Classification Search
CPC ........ A01G 18/20; A01G 18/70; A01G 18/62; A01G 18/64; A01G 18/00; A01G 18/69
See application file for complete search history.

(56) References Cited

U.S. PATENT DOCUMENTS

2020/0100437 A1* 4/2020 Christiaens ............ A01G 31/06

FOREIGN PATENT DOCUMENTS

| CN | 103238477 A | 8/2013 |
| CN | 203985152 U | 12/2014 |

(Continued)

OTHER PUBLICATIONS

Search Report from European Patent Office, completed on Jun. 29, 2020, for Dutch (NL) 2024383, 11 sheets.
(Continued)

*Primary Examiner* — Monica L Barlow
*Assistant Examiner* — Aaron M Rodziwicz
(74) *Attorney, Agent, or Firm* — Katten Muchin Rosenman LLP

(57) ABSTRACT

The present invention relates to a device for growing mushrooms, comprising a shelving, arranged for supporting beds for holding casing soil and compost on a pulling net, said beds for holding compost on a pulling net wherein the beds are placed at a mutual distance above each other wherein the beds are mutually movable, between at least a first position, wherein a second bed supported above a first bed at least partially impedes the accessibility of the first bed in a direction perpendicular to the plane in which the first bed extends; and a second position in which at least a larger part of the first bed is free approachable from a direction perpendicular to the plane in which the first bed extends than in the first position, wherein the displacement between the first and the second position requires a displacement of the first bed only, and wherein the device comprises a mechanic coupling between at least two beds, for moving the beds from the first position to the second position simultaneously.

15 Claims, 1 Drawing Sheet

(51) Int. Cl.
*A01G 18/70* (2018.01)
*A01G 18/20* (2018.01)

(56) References Cited

FOREIGN PATENT DOCUMENTS

| | | | | | |
|---|---|---|---|---|---|
| CN | 107691121 | A | | 2/2018 | |
| CN | 207040403 | U | | 2/2018 | |
| CN | 207040404 | U | | 2/2018 | |
| CN | 207040404 | U | * | 2/2018 | |
| CN | 108184552 | A | | 6/2018 | |
| CN | 209151824 | U | | 7/2019 | |
| EP | 1568265 | A2 | | 8/2005 | |
| EP | 3387896 | A2 | * | 10/2018 | ............ A01G 18/70 |
| EP | 3387896 | A2 | | 10/2018 | |
| EP | 3387896 | A3 | | 3/2019 | |
| EP | 3469889 | A1 | | 4/2019 | |
| FR | 1066500 | A | * | 6/1954 | ............ A01G 18/62 |
| FR | 1116739 | A | * | 5/1956 | ............ A01G 18/62 |
| JP | 2012-055234 | A | | 3/2012 | |
| JP | 2012-110285 | A | | 6/2012 | |
| NL | 1027511 | C2 | | 5/2006 | |
| NL | 2021053 | B1 | | 12/2019 | |
| NL | 2024214 | A | | 12/2019 | |
| NL | 2024215 | A | | 12/2019 | |
| NL | 2021456 | B1 | | 2/2020 | |
| NL | 2022318 | B1 | | 7/2020 | |
| NL | 2022703 | B1 | | 9/2020 | |
| WO | WO-2005077152 | A1 | * | 8/2005 | ............ A01G 31/06 |
| WO | WO-2017078535 | A1 | * | 5/2017 | ............ A01G 18/62 |
| WO | WO-2017105067 | A1 | * | 6/2017 | ............ A01G 18/50 |
| WO | WO-2019226046 | A1 | * | 11/2019 | ............ A23K 50/80 |
| WO | WO-2020013756 | A1 | * | 1/2020 | ............ A01G 18/62 |

OTHER PUBLICATIONS

Gerben straatsma et al: "Nieuwe metnoden voor de handmatige oogst van champignons", Jan. 1, 2007 (Jan. 1, 2007), XP055648091, Gevonden op het Internet: URL:https://www.wur.nl/nl/Publicatie-details.htm?publicationId=publication-way-333630383532 [gevonden op Dec. 2, 2019] *het gehele document*, 40 sheets. Translation: Gerben Straatsma ET AL: "New methods for manual harvesting of mushrooms", Jan. 1, 2007 (Jan. 1, 2007), XP055648091, Found on the Internet: URL:https://www.wur.nl/nl/Publicatie-details.htm?.

* cited by examiner

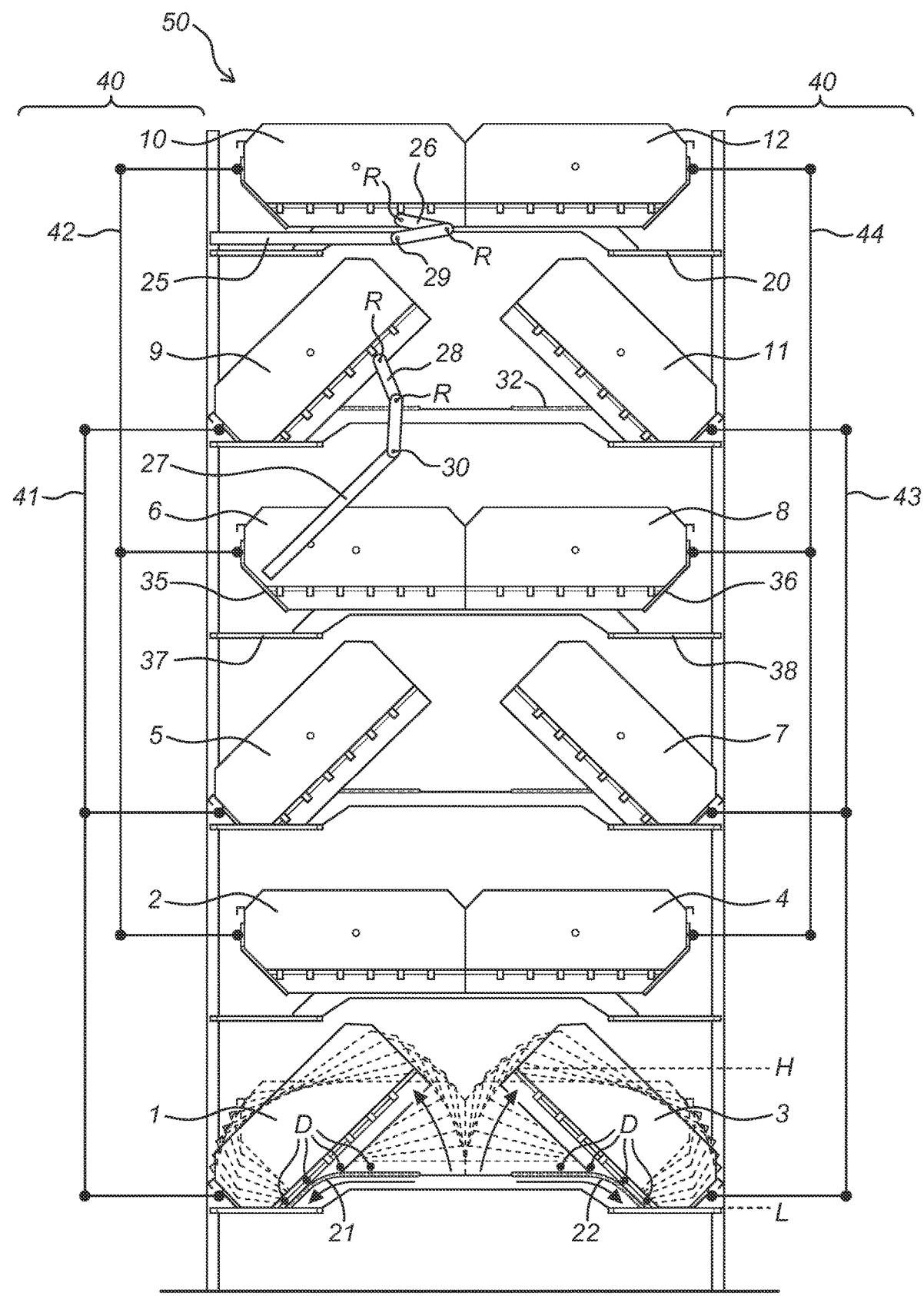

DEVICE WITH COUPLED BEDS FOR GROWING MUSHROOMS

CROSS REFERENCE TO RELATED APPLICATIONS

This application claims priority of Dutch (NL) Patent Application No. 2024383, filed on Dec. 4, 2019 in the Dutch Patent Office, which is herein incorporated by reference in its entirety.

TECHNICAL FIELD

The present invention relates to coupled beds for growing mushrooms.

BACKGROUND

It is known to grow mushrooms on a small scale. Racks are proposed for this purpose, for instance in the Chinese utility models CN207040404, CN207040403 and CN103238477. These publications describe solutions that are limited to growing mushrooms in pots or in containers. At industrial scales, mushrooms are traditionally grown at indoor locations, often called growing rooms, wherein shelvings are placed that support beds for holding compost and casing soil, on which the mushrooms are grown.

In contrast to the pots and containers used in the small scale solutions described above, at industrial scale the compost and casing soil are placed on pulling nets, that allow to fill and empty the bed with compost and casing soil easily. Usually, this is done after every two or three flushes of mushrooms, since the compost has lost its fertility and nutrition then.

The beds are placed at a mutual distance above each other in the shelving, and harvest of the mushrooms takes place manually by harvesters, standing next to the beds at various height levels and delivering the mushrooms to harvesting conveyors once they are cut. From there on they are further processed, either manually or in an automated way.

The beds have an average length of 10 to 100 meters, a width of 0.5 to 2 meters, and are usually placed 0.4 to 1.4 meters above each other. As a result, the harvesters cannot reach all mushrooms without stooping. Given the required speed of working and the total length of the beds, this makes harvesting a cumbersome job, with even certain health risks. Moreover, harvesters tend to stand straight to avoid a painful back, but in this position they only have sight to a part of the bed, with the result that part of the harvesting takes place on intuition, which may have a negative impact on the quality of the work, since a better selection can be made when an eye is kept on the work.

Examples of beds that are suitable for growing mushrooms at an industrial scale are known from various patent publications. Examples are CN203985152, CN107691121, EP1568265, JP 2012-055234, CN207040403, CN207040404, JP2012-110285, CN102238477 and NL1027511. Also the 2007 publication by the Wageningen University & Research division Praktijkonderzoek Plant & Omgeving, Paddestoelen, titled "Nieuwe methoden voor de handmatige oogst van champignons" discloses several solutions that are more or less suitable for growing mushrooms at an industrial scale, however, all without providing a solution that takes away the disadvantages of bad sight at the working area and the health consequences thereof.

SUMMARY

It is a goal of the present invention to provide a device for growing mushrooms that takes away the disadvantages of the prior art. The invention thereto proposes a device according to claims presented below. The shelving may in general be constructed as described in, or constructed with any combination of the features disclosed in any of the Dutch patent applications 2021053, 2024214, 2024215, 2021456, 2022318, or 2022703 by the same Applicant, which are herein incorporated by reference.

These advantages and others are achieved, for example, by a device for growing mushrooms. The device includes a plurality of beds for holding compost on a pulling net and a shelving arranged for supporting the beds for holding casing soil and compost on the pulling net. The beds are placed at a mutual distance above each other. The beds are mutually movable between at least a first position, where a second bed supported above a first bed at least partially impedes the accessibility of the first bed in a direction perpendicular to the plane in which the first bed extends, and a second position in which at least a larger part of the first bed is free approachable from a direction perpendicular to the plane in which the first bed extends than in the first position. The displacement between the first and the second position requires a displacement of the first bed only. The device further includes a mechanic coupling between at least two beds, for moving the beds from the first position to the second position simultaneously.

For this purpose, it is beneficial when the shelving is configured such that there are no parts, in particular stands, impede access to the beds at the ends thereof. The invention will now be elucidated into more detail with reference to the following figures.

BRIEF DESCRIPTION OF THE DRAWINGS

The invention will now be elucidated into more detail with reference to the following figures, wherein:

FIG. 1 is a first schematic side-view of a device according to the present invention.

DETAILED DESCRIPTIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a device 50 for growing mushrooms, comprising a shelving 20, arranged for supporting beds 1-12 for holding casing soil and compost on a pulling net, wherein the beds 1-12 are placed at a mutual distance above each other and the beds are mutually movable, between at least a first position (shown for beds 2, 4, 6, 8, 10, 12), wherein a second bed supported above a first bed at least partially impedes the accessibility of the first bed in a direction perpendicular to the plane in which the first bed extends, and a second position (shown for beds 1, 3, 5, 7, 9, 11) in which at least a larger part of the first bed is free approachable from a direction perpendicular to the plane in which the first bed extends than in the first position, bed, wherein there is at least a free zone, preferably of 40 cm, in said perpendicular direction, wherein the displacement between the first and the second position requires a displacement of the first bed only. In the embodiment shown in FIG. 1, the movement between the first and the second position comprises both a translation, in particular in a width direction, and a rotation of the bed. Various positions during movement from the first to the second position are shown for beds 1 and 2. In FIG. 1, it is visible that the translation and rotation are related such that a side of the bed to which direction the rotation takes place ends up in a lower position L than the higher position H of its opposite site. The embodiment of the device shown in FIG. 1 is configured for simultaneously translating and rotating during movement, along a predetermined path. The guidance comprises preferably a leaf spring 21, 22, 32.

The position of a point of support that supports the bed with respect to the leaf spring 21, 22 is located at various positions, indicated with dots D with respect to the bed 9, 10 during the movement of the bed 9, 10 from the first to the second position. The FIGURE shows a device that comprises a mechanic coupling 40 between multiple beds. The mechanic coupling 40 is schematically shown and not in realistic proportions. The mechanic coupling 40 couples multiple non-adjacent beds in vertical direction for moving the beds from the first position to the second position simultaneously. In the embodiment shown the beds at one side at an odd level are coupled, the mechanic coupling 41 couples beds 1, 5 and 9, such that the beds at an even level are coupled, mechanic coupling 42 couples beds 2, 6 and 10. Mechanical coupling 43 couples beds 3, 7, 11, and mechanical coupling 44 couples beds 4, 8, 12. The mechanic coupling is configured to move the beds from the first position to the second position simultaneously. In the device according to the present invention, the mechanic coupling will be positioned within the contour of the device. The beds are coupled such that the mechanic coupling does not counteract the supply and discharge of the compost and casing soil.

At least a lower corner 35, 36 of the beds is truncated, for forming a stop in an extreme position of the translation and rotation of the bed. Cooperating abutments 37, 38 may be provided for that purpose.

FIG. 1 also shows an operating device 25, 27 for moving a bed from the first position to the second position, wherein the operating member comprises a lever 25 that is rotatable about an axis of rotation 29, 30 and that is rotatably coupled to at least one arm 26, 28 at a distance from said axis of rotation, wherein said arm is further rotatably coupled to the bed 9, 10.

The mechanic coupling 40 provides the possibility to operate multiple beds at the same time, whilst maintaining the flexibility of the harvester to operate at its own pace. The coupling simplifies the construction of the device 50, by eliminating individual operating levers for the beds and consolidating this into a coupling of multiple beds, resulting in the needs or less parts. This is beneficial to reduce material use, production time and costs. The beds are preferably coupled such that the mechanic coupling does not counteract the supply and discharge of the compost and casing soil.

In an embodiment of the present invention the mechanic coupling 40 is coupled to at least two beds that are not adjacent in a vertical direction. In a further embodiment, there is at least one bed in between the coupled beds, which at least one bed is not coupled by the mechanic coupling. To skip at least one bed in vertical direction in the mechanic coupling is important because otherwise the harvesting of the first bed, the lowest bed, will be impeded by the second bed, the upper bed.

In a further embodiment, the device 50 according to the present invention comprises a plurality of beds 1-12, placed at a mutual distance above each other, each at a different level in a vertical direction, so that odd and even levels can be distinguished. Possibly multiple beds, preferably two, are placed at the same level. However, the mechanic coupling 40 couples only beds that are positioned above each other in a vertical direction.

In a preferred embodiment a first mechanic coupling 42, 44 couples multiple beds at an even level in the shelving and a second mechanic coupling 41, 43 couples multiple beds at an odd level in the shelving.

Furthermore, it is preferred that multiple harvesters can work simultaneously and independently to harvest mushrooms from the device. The device 50 therefore may have two opposing sides, each side providing access to multiple beds vertically placed above each other. This preferred embodiment comprises at least two mechanic couplings that each couple beds that are approachable from the same side.

The device 50 according to the present invention, wherein the movement between the first and the second position comprises at least a rotation and may also comprise a translation, has the advantage that optimal use is made of the available space. The translation and rotation are preferably related such that a side of the bed to which direction the rotation takes place ends up in a lower position than its opposite site. As a result, a bed is moved toward a harvester and rotated such that its surface is optimally available for harvesting.

An alternative embodiment of the device 50 according to the present invention may comprise a shelving, wherein at least one pair of beds at the same height supported by the shelving, which beds extend parallel to each other, wherein the pair of beds at or essentially at the same height are rotatable in the opposite direction. In this embodiment the mechanic coupling 40 may couple the at least one pair of beds.

In another alternative embodiment, the device 50 according to the present invention may comprise at least one portal, the portal comprising at least two essentially vertical stands, connected by at least one beam that extends from a first stand to the second stand. In this embodiment the device may also comprise multiple beams extending from the first stand to the second stand at various heights along the stands, each beam movably supporting two beds. The beams essentially connect the stands in a horizontal direction, but their shape is not limited to a straight line, may be for example a beam comprising slopes.

For operating the device 50 according to the invention even more easily, it may be that the device comprises an actuator, such as an electric motor, a hydraulic or pneumatic cylinder or the like, for moving the mechanic coupling 40 in order to move the beds coupled to the mechanic coupling 40 simultaneously. The operating device 25, 27 may be present on both sides of the present invention so that the vertical beds can be actuated separately, to keep the flexibility to operate each side independently. This may be an operating device 25, 27 for moving the coupled beds from the first position to the second position, wherein the operating member 25, 27 comprises a lever that is rotatable about an axis of rotation and that is rotatably coupled to an arm 26, 28 at a distance from said axis of rotation 29, 30, wherein said arm is further rotatably coupled to a bed of the coupled beds. The mechanic coupling 40 of the beds is advantageous because this requires less actuators to be used in the device to be able to move all beds between a first and a second position.

A lower corner 35, 36 of the bed may further be truncated, for forming a stop in an extreme position of the translation and rotation of the bed. An additional advantage is that this allows a configuration wherein during movement of the bed, no part of the bed extends beyond the contour of the shelving, which increases safety for harvesters and for moving vehicles such as lorries along the shelving.

The above mentioned shelving may form part of a configurations with at least two shelvings, wherein it forms a first shelving and wherein the device comprises a second shelving, placed at the head end of the first shelving, wherein the first and second shelving are configured for displacement of a pulling net with compost and casing soil from the second shelving to the first shelving. Such configuration may comprise a support for the pulling net, wherein the support is placed or placeable between a bed in the first shelving and a bed in the second shelving.

The figures are for illustrative purposes only and do in no sense limit the scope of protection as defined by the following claims. Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A device for growing mushrooms, comprising:
    a plurality of beds for holding compost on a pulling net; and
    a shelving arranged for supporting the beds for holding casing soil and compost on the pulling net, wherein:
        the beds are placed at a mutual distance above each other; and
        the beds are mutually movable, between at least:
            a first position wherein a second bed supported above a first bed at least partially impedes the accessibility of the first bed in a direction perpendicular to a plane in which the first bed extends; and
            a second position in which at least a larger part of the first bed is free approachable from a direction perpendicular to the plane in which the first bed extends than in the first position;
    wherein the displacement between the first and the second position requires a displacement of the first bed only, and
    wherein the device comprises a mechanic coupling between at least two beds, for moving the beds from the first position to the second position simultaneously.

2. The device according to claim 1, wherein the mechanic coupling is coupled to at least two beds that are not adjacent in a vertical direction, and wherein at least one bed is in between the beds to which the mechanic coupling is coupled, and the at least one bed is not coupled to the mechanic coupling.

3. The device according to claim 1, wherein the mechanic coupling couples all beds at an even level in the shelving, and skips the beds at an odd level.

4. The device according to claim 1, wherein the mechanic coupling couples all beds at an odd level in the shelving, and skips the beds at an even level.

5. The device according to claim 1, wherein the device has two opposing sides, and each side providing access to multiple beds vertically placed above each other, comprising at least two mechanic couplings that each couple beds that are approachable from the same side.

6. The device according to claim 1, wherein the movement between the first and the second position comprises a rotation of the bed.

7. The device according to claim 1, wherein the movement between the first and the second position comprises both a translation, substantially in a width direction, and a rotation of the bed.

8. The device according to claim 7, wherein the translation and rotation are related such that a side of the bed to which direction the rotation takes place ends up in a lower position than an opposite side of the bed.

9. The device according to claim 1, wherein at least one pair of beds are at the same height supported by the shelving, extending parallel to each other, and wherein the pair of beds at or essentially at the same height are rotatable in the opposite direction.

10. The device according to claim 9, wherein the mechanic coupling couples the at least one pair of beds.

11. The device according to claim 1, wherein the shelving comprises at least one portal, the portal comprising at least two essentially vertical stands, connected by at least one beam that extends from a first stand to the second stand, wherein at least two beds are movably supported by the at least one beam.

12. The device according to claim 1, wherein the device comprises an actuator for moving the mechanic coupling in order to move the beds coupled to the mechanic coupling simultaneously.

13. The device according to claim 1, further comprising an operating device for moving the bed between the first position and the second position, wherein the operating device comprises a lever that is rotatable about an axis of rotation and that is rotatably coupled to at least one arm at a distance from said axis of rotation, wherein said arm is further rotatably coupled to the bed.

14. A method for growing mushrooms, comprising using the device according to claim 1.

15. The method according to claim 14, comprising moving a first bed to a second position and approaching the first bed from a direction perpendicular to a surface of the first bed for harvesting mushrooms.

* * * * *